(12) United States Patent
Jeong et al.

(10) Patent No.: US 12,365,293 B2
(45) Date of Patent: Jul. 22, 2025

(54) VIDEO RECORDING APPARATUS AND CONTROLLING METHOD THEREOF

(71) Applicants: Hyundai Motor Company, Seoul (KR); Kia Corporation, Seoul (KR)

(72) Inventors: Dong Hyuk Jeong, Gyeonggi-do (KR); Gyun Ha Kim, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 194 days.

(21) Appl. No.: 17/981,439

(22) Filed: Nov. 6, 2022

(65) Prior Publication Data

US 2023/0202406 A1 Jun. 29, 2023

(30) Foreign Application Priority Data

Dec. 24, 2021 (KR) .................. 10-2021-0187798
Apr. 25, 2022 (KR) .................. 10-2022-0050889

(51) Int. Cl.
*B60R 11/04* (2006.01)
*G06V 20/58* (2022.01)

(52) U.S. Cl.
CPC .............. *B60R 11/04* (2013.01); *G06V 20/58* (2022.01); *B60R 2300/301* (2013.01); *B60R 2300/404* (2013.01)

(58) Field of Classification Search
CPC .............. B60R 11/04; B60R 2300/301; B60R 2300/30; B60R 2300/404; B60R 2300/8073; B60R 2325/105; G06V 10/62; G06V 20/58; G06V 20/56; G06V 20/52

USPC .......................................................... 348/148
See application file for complete search history.

(56) References Cited

U.S. PATENT DOCUMENTS

| | | | |
|---|---|---|---|
| 10,771,669 B1* | 9/2020 | Balasubramanian | ... G01S 17/87 |
| 2013/0329017 A1 | 12/2013 | Hayakawa et al. | |
| 2018/0215344 A1* | 8/2018 | Santora | .............. B60R 25/33 |
| 2022/0111856 A1* | 4/2022 | Kim | ................ G01S 13/04 |
| 2023/0083504 A1* | 3/2023 | Burns | .............. B60R 25/305 |
| | | | 705/4 |

FOREIGN PATENT DOCUMENTS

| | | |
|---|---|---|
| JP | 5433610 B2 | 3/2014 |
| JP | 2020-170505 A | 10/2020 |
| KR | 10-2011-0087736 A | 8/2011 |
| KR | 10-2011-0107084 A | 9/2011 |
| KR | 10-2015-0125319 A | 11/2015 |
| KR | 10-1850058 B1 | 4/2018 |

* cited by examiner

*Primary Examiner* — Nathnael Aynalem
(74) *Attorney, Agent, or Firm* — Fox Rothschild LLP

(57) ABSTRACT

The present disclosure relates to a video recording apparatus and a controlling method thereof. According to an embodiment of the present disclosure, a video recording apparatus may include a motion detection sensor, a controller, and an application processor. The motion detection sensor may sense motion of an external object outside of a vehicle. The controller may be activated if the motion detection sensor senses motion of the external object and may monitor the external object through the motion detection sensor during a predetermined time period. An image processor may be activated based on a monitoring result of the external object so as to perform a video recording function.

16 Claims, 18 Drawing Sheets

VIDEO RECORDING APPARATUS AND CONTROLLING METHOD THEREOF

CROSS-REFERENCE TO RELATED APPLICATION

This application claims under 35 U.S.C. § 119(a) the benefit of and priority to Korean Patent Application No. 10-2021-0187798, filed in the Korean Intellectual Property Office on Dec. 24, 2021, and Korean Patent Application No. 10-2022-0050889, filed in the Korean Intellectual Property Office on Apr. 25, 2022, the entire contents of each are incorporated herein by reference.

BACKGROUND

Technical Field

The present disclosure relates to a video recording apparatus and a controlling method thereof, and in particular, relates to provide a video recording apparatus for a vehicle that is capable of reducing power consumption.

Background

A Dashboard Camera that records a collision with an external object while a vehicle is stopped or driving is widely used. A general dashboard Camera continuously obtains external images through a continuous recording function. When the continuous recording function is used, a recording time may be limited due to memory capacity. In particular, when the vehicle's engine is turned off, the battery that supplies power to the dashboard Camera may be discharged.

To fix the issues, a video is recorded through an impact detection recording function only when there is a specific impact. However, to record the video just before the impact even when the impact detection recording function is used, continuous video recording is basically performed, and thus a current may be consumed excessively.

SUMMARY

The present disclosure has been made to address the above-mentioned problems occurring in the related art while advantages achieved by the related art are maintained intact.

An aspect of the present disclosure provides a video recording apparatus capable of reducing power consumption, and a controlling method thereof.

Moreover, an aspect of the present disclosure provides a video recording apparatus capable of preventing unnecessary images from being recorded due to an object that does not have a threat to a vehicle, and a controlling method thereof.

The technical problems to be addressed by the present disclosure are not limited to the aforementioned problems, and any other technical problems not mentioned herein will be clearly understood from the following description by those skilled in the art to which the present disclosure pertains.

According to an aspect of the present disclosure, a video recording apparatus may include a motion detection sensor, a controller, and an application processor. The motion detection sensor may sense motion of an external object outside of a vehicle. The controller may be configured to activate if the motion detection sensor senses motion of the external object and may monitor the motion of the external object via the motion detection sensor during a predetermined time period. An image processor may be configured to activate based on a monitoring result of the external object so as to perform a video recording function of the object.

According to an embodiment of the present disclosure, the controller and the image processor are each configured to enter a deactivation state if an ignition of the vehicle is turned off.

According to an embodiment of the present disclosure, the motion detection sensor may obtain sensing data in a digital format at specific intervals based on a reception signal of radar and may determine signal strength of the reception signal and/or a detected distance of the external object based on the sensing data.

According to an embodiment of the present disclosure, the motion detection sensor may generate an activation signal for allowing the motion detection sensor to activate the controller if (a) the signal strength is greater than or equal to a threshold strength and/or (b) the detected distance is less than a threshold distance, and may transmit the activation signal to the controller based on low voltage differential signaling (LVDS).

According to an embodiment of the present disclosure, the controller may receive the sensing data from the motion detection sensor during the predetermined time period, may detect target data from among sensing data, the target data having a signal strength greater than or equal to a threshold strength and/or a detected distance less than the threshold distance, and may activate the image processor or maintain a deactivation state of the image processor based on the target data.

According to an embodiment of the present disclosure, the controller is further configured to maintain the deactivation state of the image processor when a first number corresponding to the target data having the signal strength greater than or equal to threshold strength is less than a first threshold value and/or a second number corresponding to the target data having the detected distance less than the threshold distance is less than a second threshold value.

According to an embodiment of the present disclosure, the controller may calculate signal strength deviations between (n+1)-th target data, where n is a natural number, and n-th target data among pieces of target data during the predetermined time period, and may activate the image processor if the number of corresponding positive values among the signal strength deviations is not less than a third threshold value.

According to an embodiment of the present disclosure, the controller may calculate detected distance deviations between (n+1)-th target data ('n' is a natural number) and n-th target data among pieces of target data during the predetermined time period, and may activate the image processor if a number of zeros or negative values among the detected distance deviations is not less than a fourth threshold value.

According to an embodiment of the present disclosure, the controller may enter a deactivation state if it is determined that the image processor maintains a deactivation state.

According to an embodiment of the present disclosure, the video recording apparatus may further include an image sensor activated under control of the image processor to obtain an image and memory storage in which an image obtained by the image sensor is stored.

According to an aspect of the present disclosure, a controlling method of a video recording apparatus may include sensing, by a motion detection sensor of a camera module, motion of an external object outside of a vehicle, activating a controller of a cam control module if motion of the object is detected, and selectively activating an image processor for video recording if the controller monitors the object during a predetermined time period.

According to an embodiment of the present disclosure, the sensing of the motion of the external object may further include deactivating the controller and the image processor if an ignition of a vehicle is turned off.

According to an embodiment of the present disclosure, the sensing of the motion of the object may include obtaining sensing data in a digital format at specific intervals based on a reception signal of radar and determining a signal strength of the reception signal and/or a detected distance of the object based on the sensing data.

According to an embodiment of the present disclosure, the activating of the controller step may further include generating an activation signal for allowing the motion detection sensor to activate the controller if the signal strength is greater than or equal to a threshold strength and/or the detected distance is less than a threshold distance and transmitting the activation signal to the controller based on low voltage differential signaling (LVDS).

According to an embodiment of the present disclosure, the selectively activating of the image processor step may further include receiving the sensing data from the motion detection sensor during the predetermined time period based on the activation of the controller, detecting target data from among the sensing data, the target data having a signal strength greater than or equal to threshold strength and/or a detected distance less than a threshold distance, and activating the image processor or maintaining a deactivation state of the image processor based on the target data.

According to an embodiment of the present disclosure, the maintaining of the deactivation state of the image processor step may be performed when a first number corresponding to the target data having the signal strength greater than or equal to the threshold strength is less than a first threshold value and/or a second number corresponding to the target data having the detected distance less than the threshold distance is less than a second threshold value.

According to an embodiment of the present disclosure, the activating of the image processor step may further include calculating signal strength deviations between (n+1)-th target data, where n is a natural number, and n-th target data among pieces of target data during the predetermined time period and activating the image processor if the number of corresponding positive values among the signal strength deviations is not less than a third threshold value.

According to an embodiment of the present disclosure, the activating of the image processor step may further include calculating detected distance deviations between (n+1)-th target data, where n is a natural number, and n-th target data among pieces of target data during the predetermined time period and activating the image processor if the number of zeros or negative values among the detected distance deviations is not less than a fourth threshold value.

According to an embodiment of the present disclosure, the selectively activating of the image processor step may further include maintaining a deactivation state of the image processor based on sensing motion of the motion detection sensor. The controller may switch from an activated state to a deactivation state if the deactivation of the image processor is maintained.

According to an embodiment of the present disclosure, the controlling method of the video recording apparatus may further include storing an image signal obtained by an image sensor of the camera module in memory storage if the image processor is activated.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
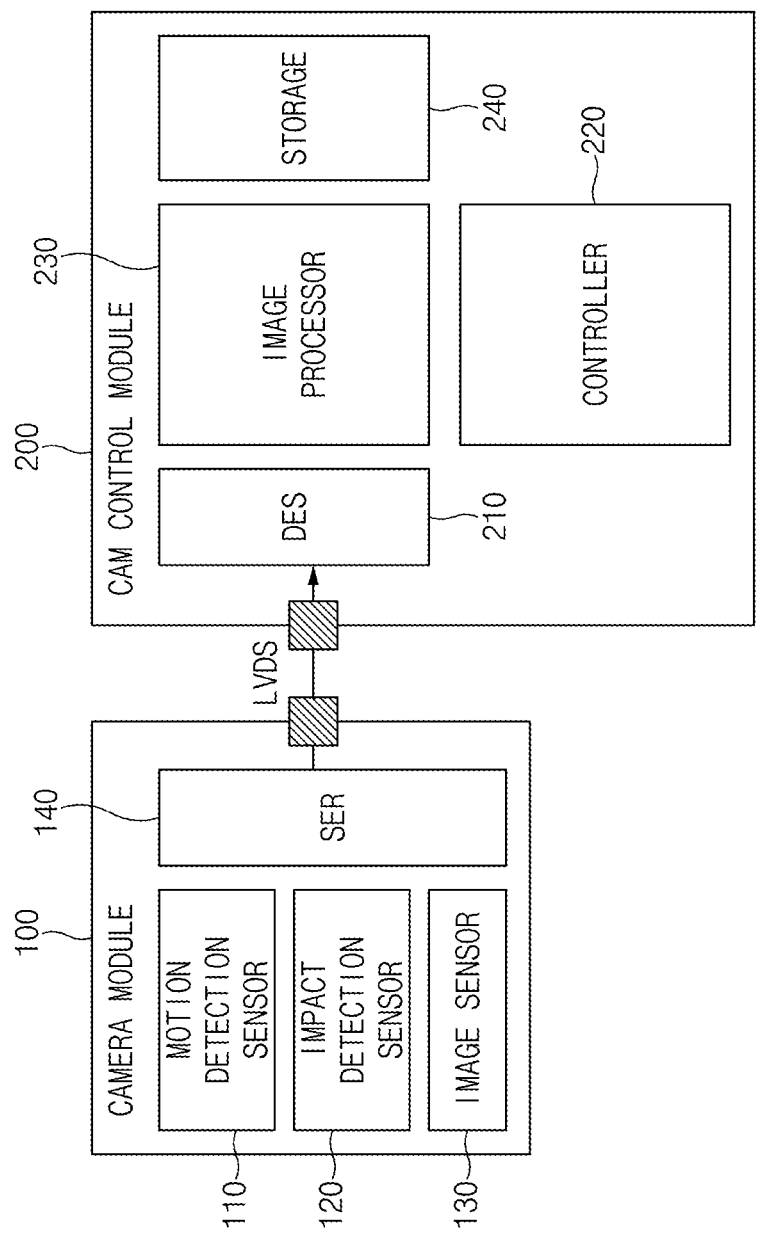
FIG. 1 is a block diagram illustrating a configuration of a video recording apparatus, according to an embodiment of the present disclosure.

Hereinafter, some embodiments of the present disclosure will be described in detail with reference to the accompanying drawings. In adding reference numerals to components of each drawing, it should be noted that the same components have the same reference numerals, although they are indicated on another drawing. In describing embodiments of the present disclosure, detailed descriptions associated with well-known functions or configurations will be omitted when they may make subject matters of the present disclosure unnecessarily obscure.

In describing components of embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning that is consistent with their meaning in the context of the present disclosure and the relevant art and will not be interpreted in an idealized or overly formal sense unless expressly so defined herein.

Hereinafter, various embodiments of the present disclosure will be described in detail with reference to FIGS. 1 to 18.

Figure 2:
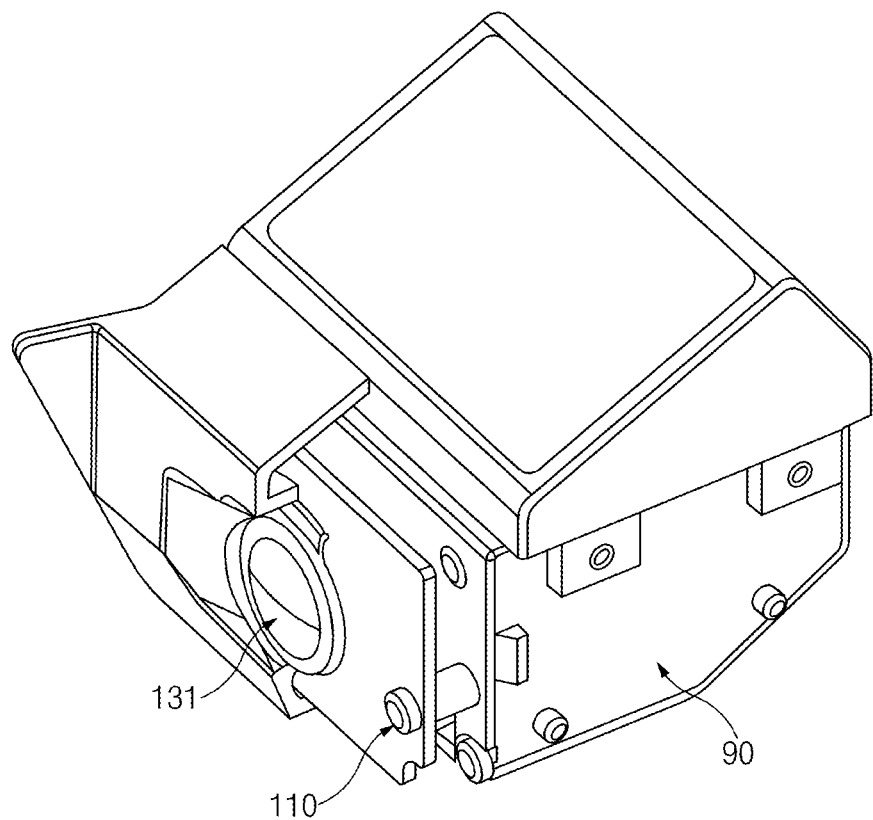
FIG. 2 is a diagram illustrating a structure of a camera module.

FIG. 1 is a block diagram illustrating a configuration of a video recording apparatus, according to an embodiment of the present disclosure. FIG. 2 is a diagram illustrating a structure of a camera module.

Referring to FIGS. 1 and 2, a video recording apparatus according to an embodiment of the present disclosure may include a camera module 100 and a cam control module 200.

The camera module 100 is used to monitor the outside of a vehicle, and is composed of a module separate from the cam control module 200. The camera module 100 may monitor the outside of the vehicle. The camera module 100 may be implemented in a form in which a motion detection sensor 110, an impact detection sensor 120, an image sensor 130, and a serializer (hereinafter, referred to as "SER") 140 are mounted in housing 90.

The motion detection sensor 110 may monitor the motion of an object outside the vehicle. The motion detection sensor 110 may be implemented as a radio detection and ranging (radar). For example, the motion detection sensor 110 may use the radar having a frequency modulated continuous wave (FMCW) type that is capable of calculating a detected distance and speed of a detection target.

The motion detection sensor 110 may transmit a transmission signal and then may detect an object based on a reception signal obtained when the transmission signal is reflected from the object. The motion detection sensor 110 may generate a bit signal based on a frequency difference between the transmission signal and the reception signal. Furthermore, the motion detection sensor 110 may generate sensing data in a digital format based on the bit signal. The sensing data may include information about signal strength or a detected distance.

A part of configurations of the motion detection sensor 110 that transmits a radar signal may be exposed outside the housing 90.

The impact detection sensor 120 may be used to detect a collision applied to a vehicle and may use an acceleration sensor. The impact detection sensor 120 may determine whether an impact is applied to the vehicle, based on variations of acceleration of the vehicle.

The image sensor 130 may generate an electrical signal based on light incident through a lens 131 exposed to the outside of the housing 90. The image sensor 130 may have a structure in which photodiodes that receive light and generate electric charges are arranged in a matrix form.

The SER 140 may serialize signals generated by the camera module 100 in a low voltage differential signaling (LVDS) method and may output the serialized signal to a 2pair differential line.

As such, the camera module 100 is implemented separately from the cam control module 200 so as to reduce a size of the camera module 100. In particular, because the motion detection sensor 110 is integrated into the camera module 100 through the housing 90, the motion detection sensor 110 may not be additionally mounted in the vehicle.

The cam control module 200 may be positioned outside the housing 90 of the camera module 100 so as to communicate with the camera module 100 based on LVDS. The cam control module 200 may include a deserializer (DES) 210, a controller 220, an image processor 230, and memory storage 240.

The DES 210 may receive the 2pair differential converted by the SER 140.

The controller 220 may be activated based on the motion of an object detected by the motion detection sensor 110 and may determine the motion pattern of the object. The controller 220 may receive sensing data from the motion detection sensor 110 during a unit period and then may detect target data, which has signal strength greater than or equal to threshold strength, or which has a detected distance less than a threshold distance, from among the sensing data. The unit period may be predetermined time period. Moreover, the controller 220 may determine whether to activate the image processor 230, based on the number of target data and the tendency of the target data.

The image processor 230 may be activated under the control of the controller 220 so as to store image data obtained by the image sensor 130 in the memory storage 240. The image processor 230 may be implemented as an application processor (hereinafter referred to as an "AP") in charge of application programs and graphic processing. Hereinafter, in an embodiment of the present disclosure, embodiments in which the image processor 230 is implemented as an AP will be mainly described.

The memory storage 240 may be provided in the controller 220 and may be a separate memory. Accordingly, the memory storage 240 may be formed of a combination of a nonvolatile memory, such as a hard disk drive, a flash memory, an electrically erasable programmable read-only memory (EEPROM), a ferro-electric RAM (FRAM), a phase-change RAM (PRAM), or a Magnetic RAM (MRAM), and/or a volatile memory, such as a static random access memory (SRAM), a dynamic RAM (DRAM), a synchronous DRAM (SDRAM), or a double date rate-SDRAM (DDR-SDRAM).

Figure 3:
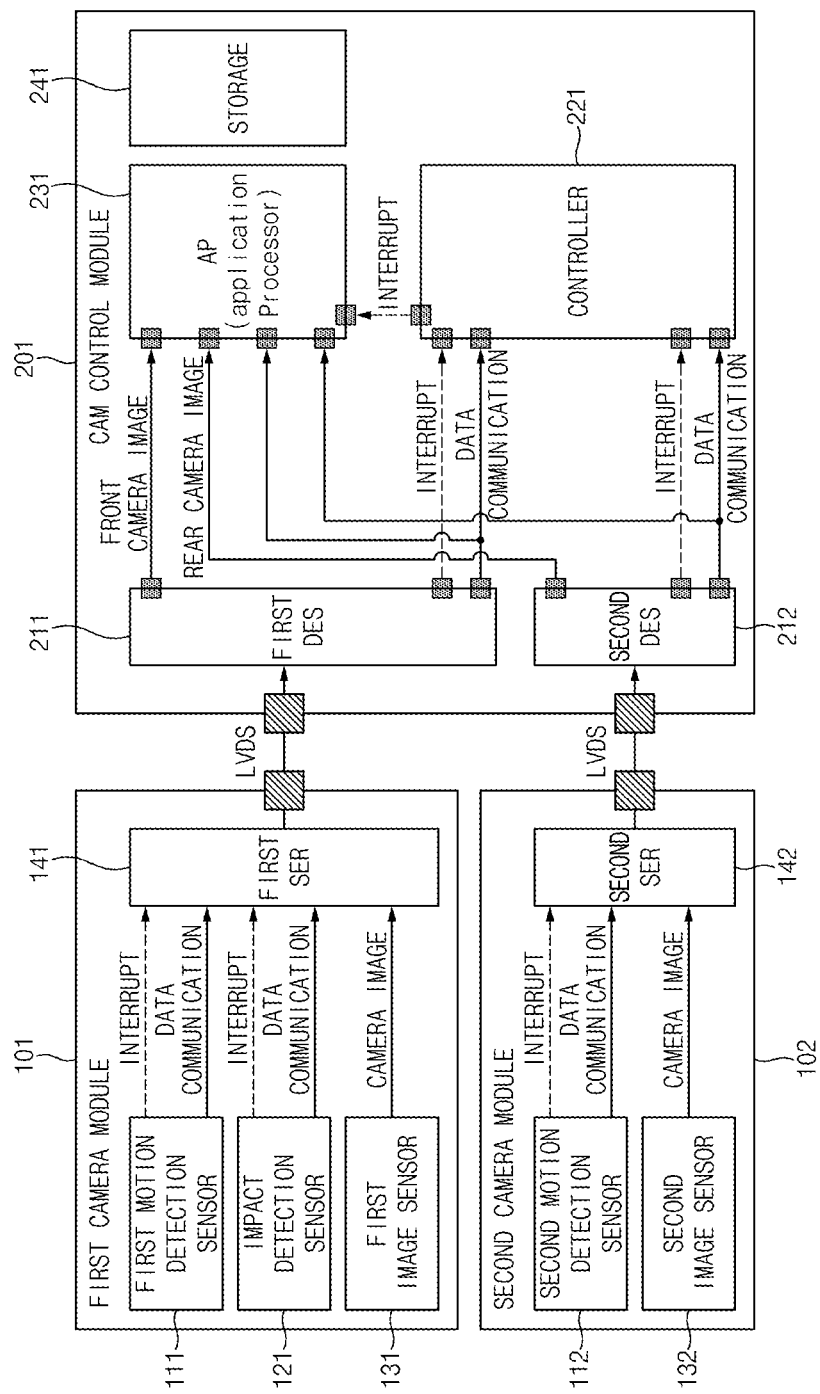
FIG. 3 is a block diagram illustrating a configuration of a video recording apparatus, according to another embodiment of the present disclosure.

FIG. 3 is a block diagram illustrating a configuration of a video recording apparatus, according to another embodiment of the present disclosure.

Referring to FIG. 3, according to another embodiment, a video recording apparatus and a communication means will be described in detail as follows. In the description of FIG. 3, a detailed description of a configuration substantially the same as the configuration shown in FIG. 1 described above will be omitted to avoid redundancy.

Referring to FIG. 3, a video recording apparatus according to an embodiment of the present disclosure may include a first camera module 101, a second camera module 102, and a cam control module 201.

The first camera module 101 may be used to monitor the front of a vehicle, and may include a first motion detection sensor 111, an impact detection sensor 121, a first image sensor 131, and a first SER 141. The first camera module 101 and the cam control module 201 may perform digital communication based on LVDS.

In detail, the first motion detection sensor 111 may generate an interrupt based on the motion of an object and may transmit the interrupt to a first DES 211 through the first SER 141. The interrupt by the first motion detection sensor 111 may be generated when the motion strength of the object is not less than threshold strength, or the detected distance indicating a location of the detected object is less than a threshold distance.

Also, the first motion detection sensor 111 may transmit sensing data generated based on the motion of the object to the first DES 211 through the first SER 141.

Moreover, the first image sensor 131 may obtain image data and may transmit the image data to the first DES 211 through the first SER 141.

Furthermore, the impact detection sensor 121 may transmit an interrupt generated by an impact applied to the vehicle to the first DES 211 through the first SER 141. Besides, the impact detection sensor 121 may transmit data generated by the impact applied to the vehicle to the first DES 211 through the first SER 141.

The second camera module 102 may be used to monitor the rear of the vehicle, and may include a second motion detection sensor 112, a second image sensor 132, and a second SER 142. The configuration of the second camera module 102 may be mounted in housing separate from the first camera module 101. The second motion detection sensor 112 may generate an interrupt based on the motion of an object and may transmit the interrupt to the second DES 212 through the second SER 142. The interrupt by the second motion detection sensor 112 may be generated when the motion strength of the object is not less than the threshold strength, or the detected distance indicating a location of the detected object is less than the threshold distance.

The second camera module 102 and the cam control module 201 may perform digital communication based on LVDS.

The cam control module 201 may be configured separately from the first and second camera modules 101 and 102, and may communicate with the first and second camera modules 101 and 102 based on LVDS. The cam control module 201 may include a first DES 211, a second DES 212, a controller 221, an AP 231, and storage 241.

Figure 4:
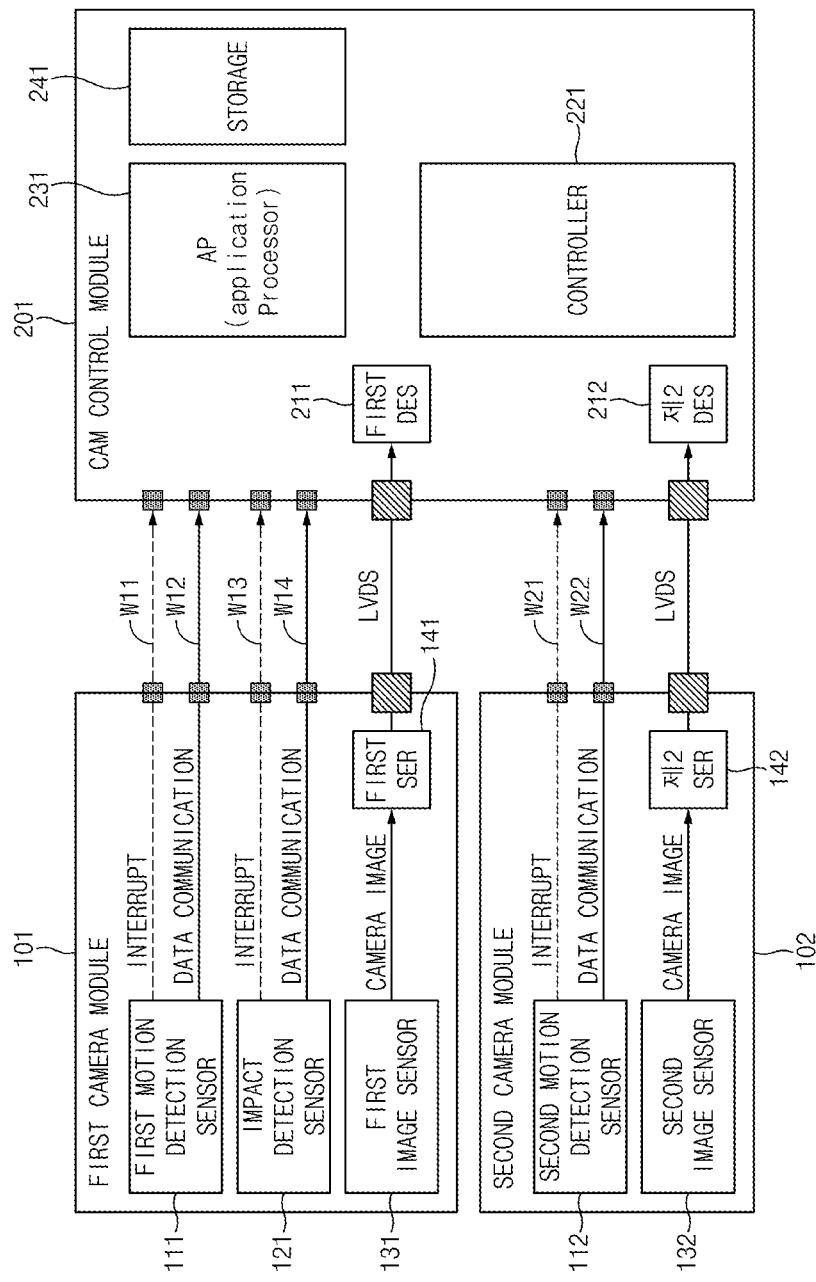
FIG. 4 is a block diagram illustrating a video recording apparatus, according to another embodiment.

FIG. 4 is a block diagram illustrating a video recording apparatus, according to another embodiment.

Referring to FIG. 4, a video recording apparatus according to another embodiment of the present disclosure may include the first camera module 101, the second camera module 102, and the cam control module 201. In the embodiment shown in FIG. 4, configurations of the first camera module 101, the second camera module 102, and the cam control module 201 may be the same as or similar to those of the embodiment shown in FIG. 3.

The first SER 141 of the first camera module 101 may communicate with the first DES 211 of the cam control module 201 based on LVDS. The first motion detection sensor 111 may transmit an interrupt to the cam control module 201 through a first wire W11, and may transmit sensing data to the cam control module 201 through a second wire W12. The impact detection sensor 121 may transmit an interrupt to the cam control module 201 through a third wire W13, and transmit data generated by impact detection to the cam control module 201 through a fourth wire W14. The first image sensor 131 may transmit image data to the cam module based on LVDS.

The second motion detection sensor 112 of the second camera module 102 may transmit an interrupt to the cam control module 201 through a fifth wire W21, and may transmit sensing data to the cam control module 201 through a sixth wire W22.

Figure 5:
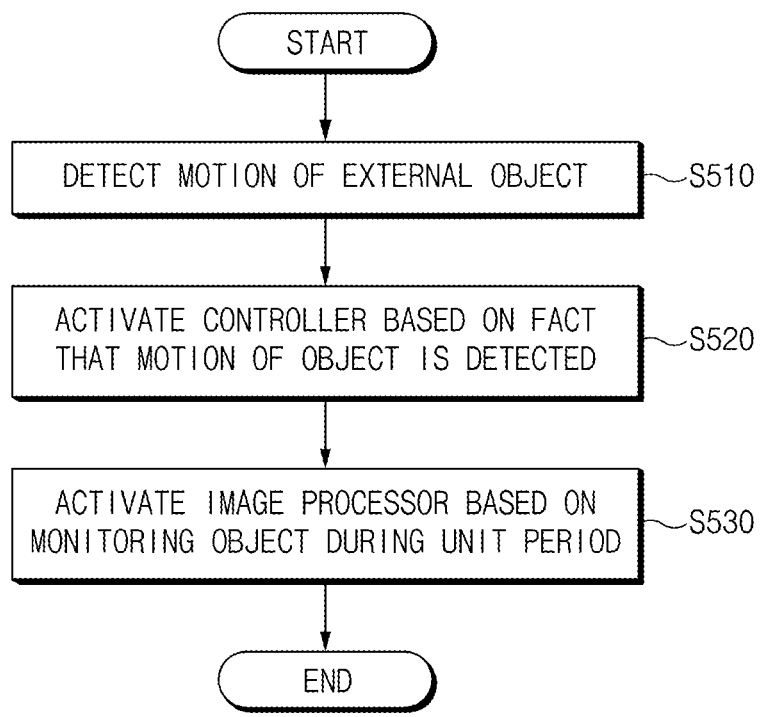
FIG. 5 is a flowchart illustrating a controlling method of a video recording apparatus, according to an embodiment of the present disclosure.

FIG. 5 is a flowchart illustrating a controlling method of a video recording apparatus, according to an embodiment of the present disclosure. The following embodiments will be described based on the video recording apparatus shown in FIG. 3.

Referring to FIG. 5, a controlling method of a video recording apparatus according to an embodiment of the present disclosure will be described as follows.

In a first step (S510), the first and second motion detection sensors 111 and 112 may detect motion of an external object. That is, the first and second motion detection sensors 111 and 112 may determine a moving object, not a fixed or stationary object. According to an embodiment of the present disclosure, the first and second motion detection sensors 111 and 112 may be implemented based on a radar system that transmits a transmission signal and monitors an object based on receiving a reception signal reflected from the object.

In a second step (S520), the first and second motion detection sensors 111 and 112 may activate the controller 221 based on a fact that the detected object is detected. The first and second motion detection sensors 111 and 112 may activate the controller 221 based on detecting a moving object.

The first and second motion detection sensors 111 and 112 may activate the controller 221 based on the motion strength of an object. The motion strength may be determined depending on a preset condition. The motion strength may be calculated based on the possibility that an object collides with a vehicle, and an impact amount predicted at the time of collision.

According to an embodiment, the first and second motion detection sensors 111 and 112 may determine the motion strength of the object based on the size of the object. For example, the first and second motion detection sensors 111 and 112 may determine that the motion strength of an object in proportion to the size of the object.

According to another embodiment, the first and second motion detection sensors 111 and 112 may determine the motion strength of the object based on the speed of the object. For example, the first and second motion detection sensors 111 and 112 may determine that the motion strength of the object increases as the speed of the object increases.

According to another embodiment, the first and second motion detection sensors 111 and 112 may determine the motion strength of the object based on the detected distance of the object. For example, the first and second motion detection sensors 111 and 112 may determine that the motion strength of the object increases as the detected distance of the object decreases.

According to an embodiment of the present disclosure, the first and second motion detection sensors 111 and 112 may estimate the size of the object based on the signal strength of the reception signal. Moreover, according to an embodiment of the present disclosure, the first and second motion detection sensors 111 and 112 may calculate the speed of the object based on the reception signal. Moreover, according to an embodiment of the present disclosure, the first and second motion detection sensors 111 and 112 may calculate the detected distance of an object based on the reception signal.

In a third step (S530), the activated controller 221 may monitor the object during a predetermined time period, and may determine whether to activate the AP 231 for video recording based on the monitoring of the object.

A procedure for monitoring the object during the predetermined time period may be determined based on the change in the motion strength of the object. Accordingly, the controller 221 may determine a motion pattern of the object based on the signal strength of the reception signal. Also, the controller 221 may calculate a detected distance based on the reception signal and may determine the motion pattern based on a change in the detected distance.

According to an embodiment, when the signal strength of the object is maintained to be greater than or equal to a specific level, the controller 221 may activate the AP 231 for video recording by determining that the predicted impact amount of the object is great.

According to another embodiment, when it is determined that the object's detected distance is gradually getting closer, the controller 221 may activate the AP 231 for video recording by determining that there is a high probability of collision with the corresponding object.

As described above, according to a controlling method of a video recording apparatus according to an embodiment of the present disclosure, because the controller 221 is activated based on motion detection, unnecessary power consumption for an operation of the controller 221 may be reduced while a vehicle is turned off. Moreover, according to the controlling method of the video recording apparatus according to an embodiment of the Present disclosure, because the AP 231 is activated depending on the type and motion of an object identified based on monitoring the object during a predetermined time period, power consumed to record unnecessary images may be improved. Besides, according to the controlling method of the video recording apparatus according to an embodiment of the present disclosure, because the video is recorded based on the monitoring of the object during the predetermined time period, unnecessary video recording may be prevented.

Figure 6:
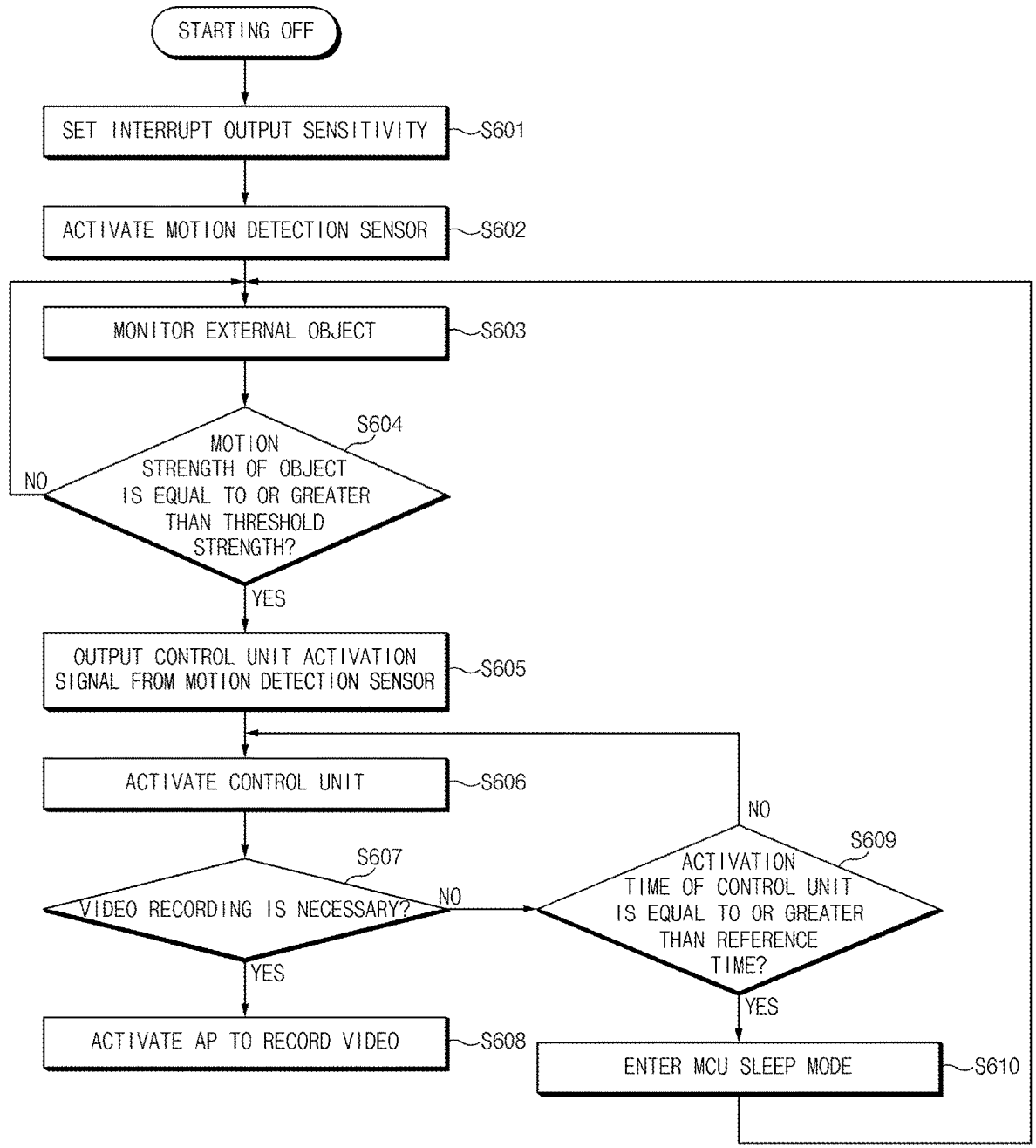
FIG. 6 is a flowchart illustrating a controlling method of a video recording apparatus, according to another embodiment of the present disclosure.

FIG. 6 is a flowchart illustrating a controlling method of a video recording apparatus, according to another embodiment of the present disclosure. FIGS. 7 to 10 are diagrams for describing a procedure in which configurations of a video recording apparatus are activated. Hereinafter, FIGS. 6 to 10 will be described based on the video recording apparatus shown in FIG. 3.

A controlling method of a video recording apparatus according to another embodiment of the present disclosure will be described with reference to FIGS. 6 to 10.

In S601, interrupt output sensitivity may be set. The interrupt output sensitivity may refer to a motion strength criterion for detecting the motion of an object by the first and second motion detection sensors 111 and 112.

Figure 11:
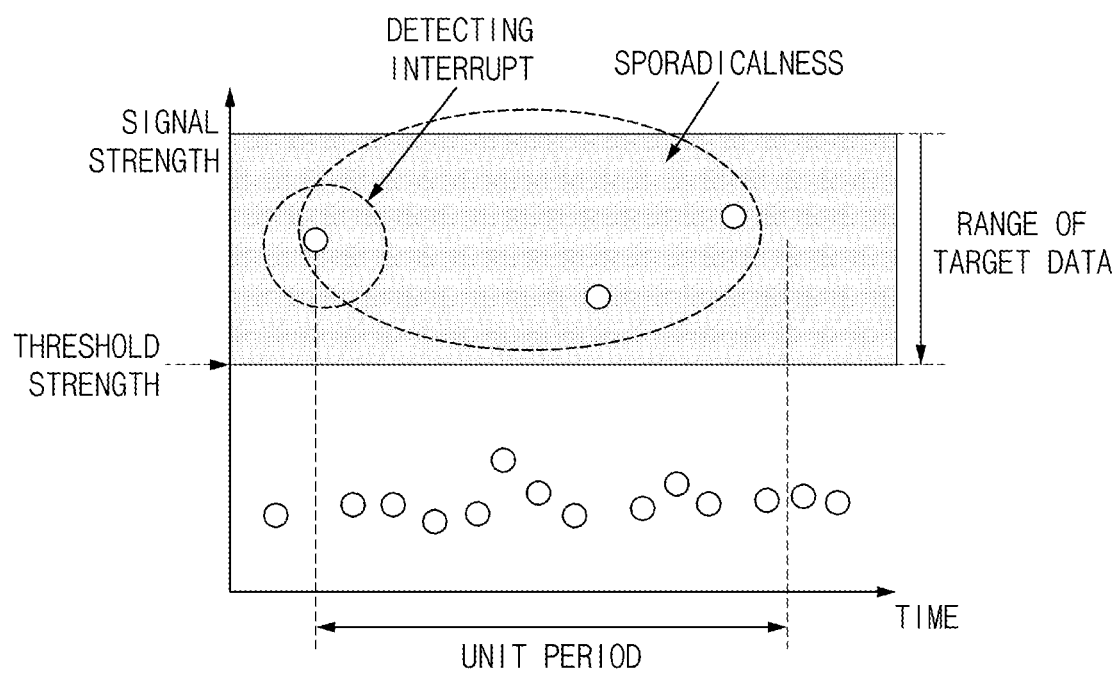
FIGS. 11, FIG. 12, and FIG. 13 are diagrams for describing an embodiment of determining whether to activate an AP according to the signal strength of sensing data.
Figure 12:
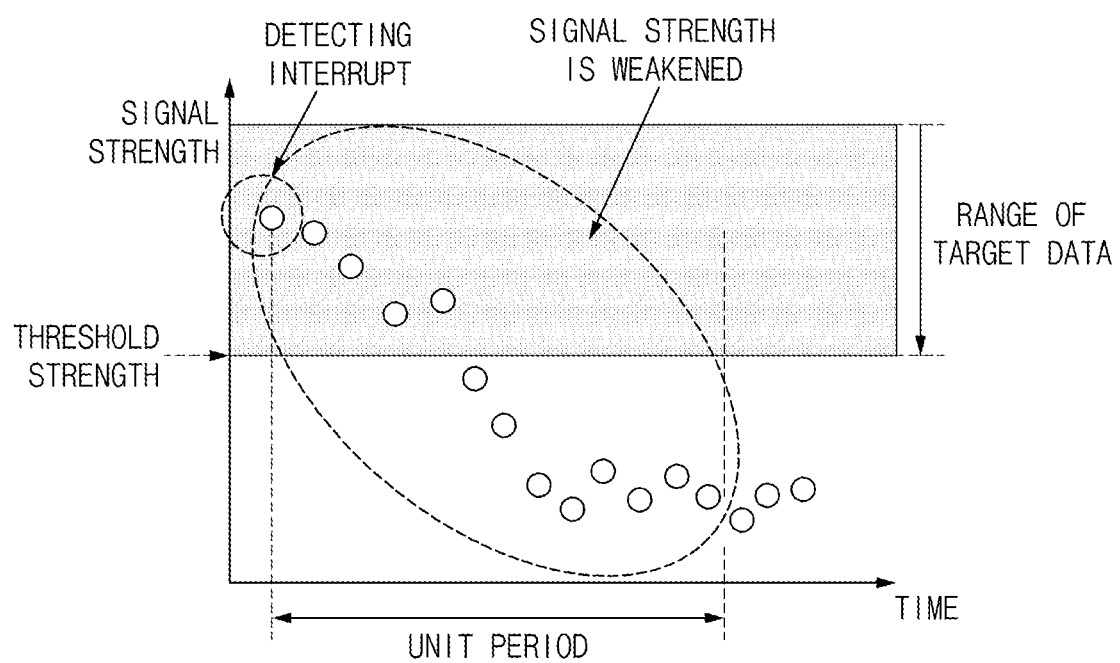
Figure 13:
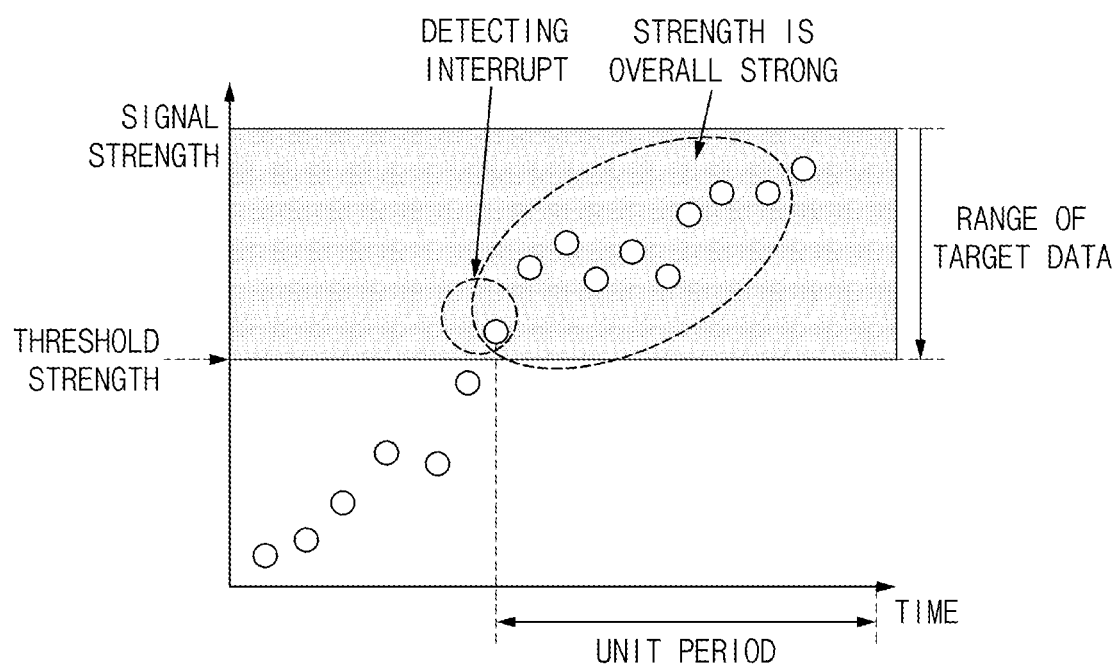

When the first and second motion detection sensors 111 and 112 determine the object based on the signal strength of the reception signal, a procedure for setting the interrupt output sensitivity may be a procedure for setting threshold strength shown in FIGS. 11 to 13.

Figure 14:
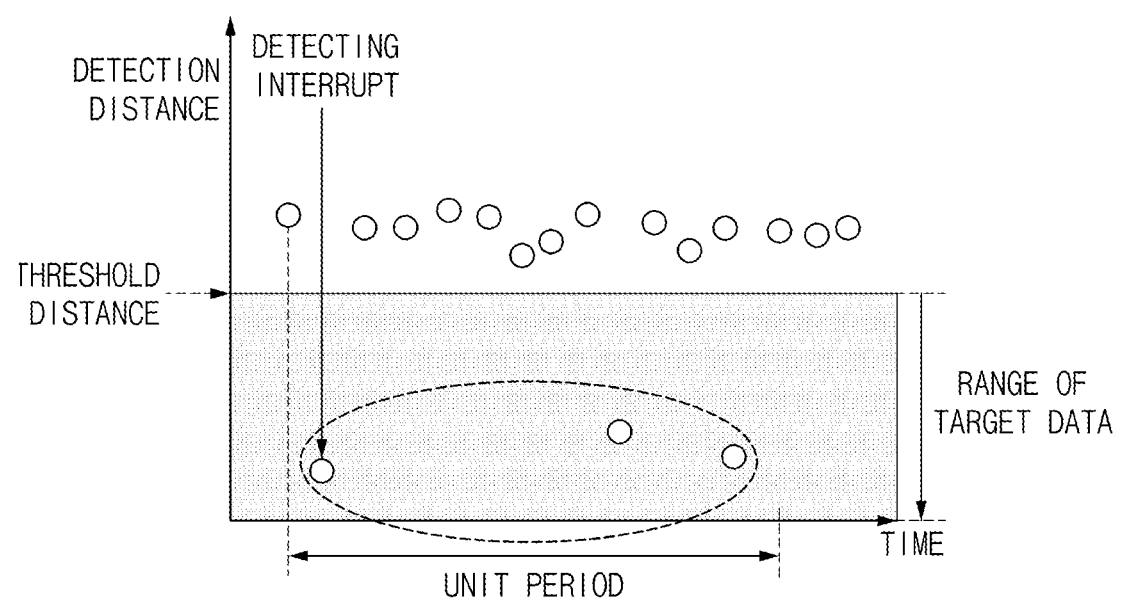
FIGS. 14, FIG. 15, and FIG. 16 are diagrams for describing an embodiment of determining whether to activate an AP according to a detected distance of sensing data.
Figure 15:
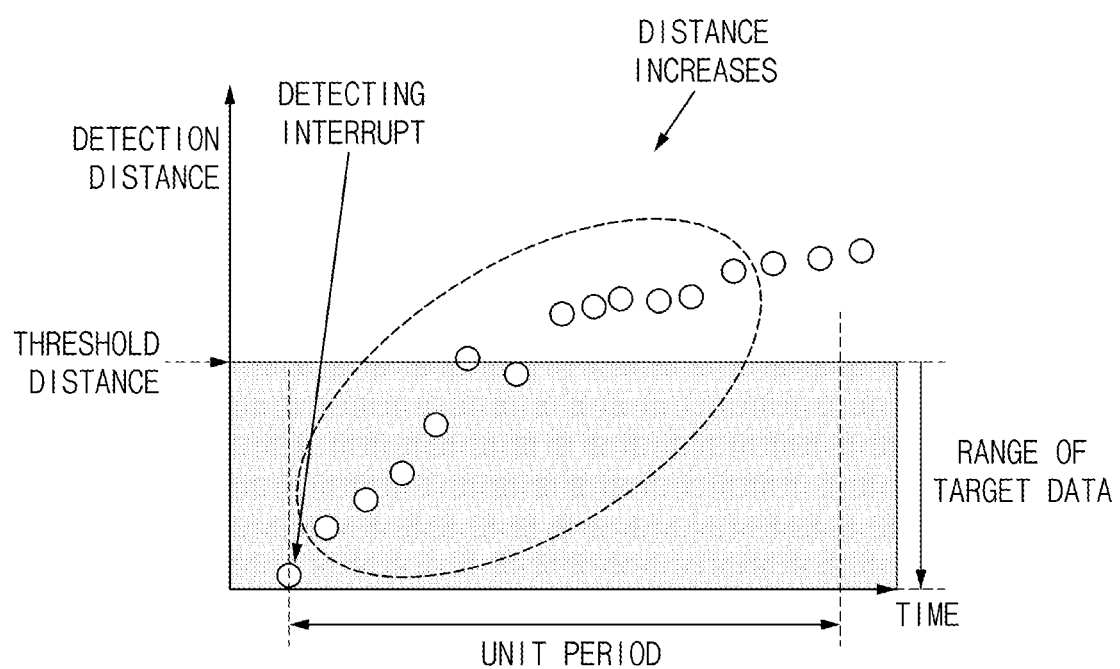
Figure 16:
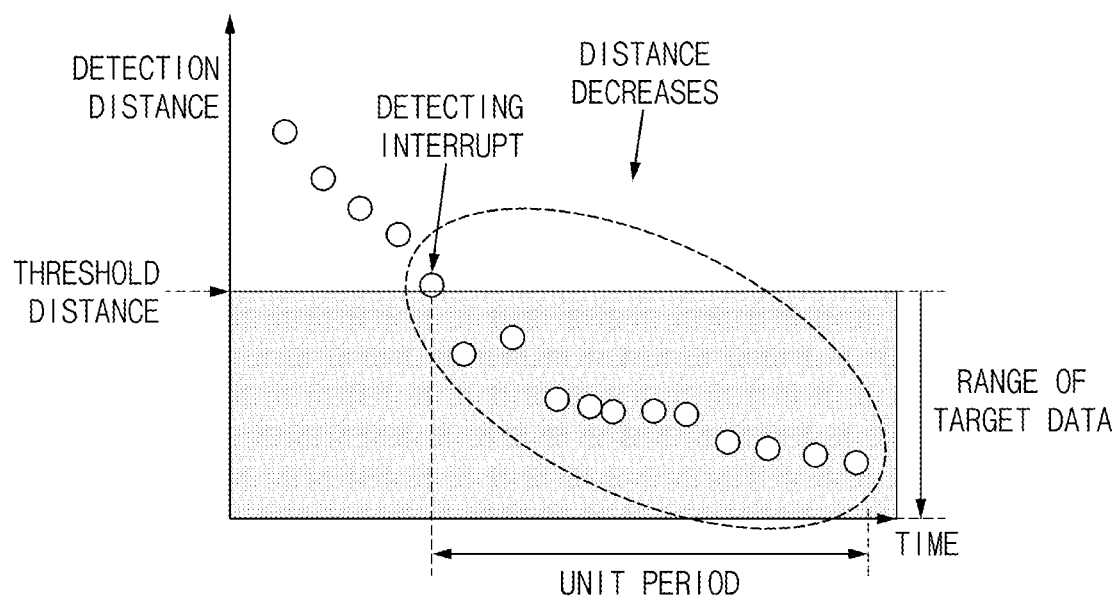

Alternatively, when the first and second motion detection sensors 111 and 112 determine an object based on a detected distance of the object, the procedure for setting the interrupt output sensitivity may be a procedure for setting the threshold distance shown in FIGS. 14 to 16.

FIG. 6 shows that a procedure for setting the interrupt output sensitivity is performed after an engine is turned off, but the sequence of the procedure for setting the interrupt output sensitivity is not limited thereto. The procedure for setting the interrupt output sensitivity may be generally performed before S602, which will be described later. However, in a process in which the video recording apparatus operates, the procedure may be involved in any procedure.

In S602 and S603, the first and second motion detection sensors 111 and 112 may be activated based on a fact that an engine is turned off, so as to monitor an external object.

Figure 7:
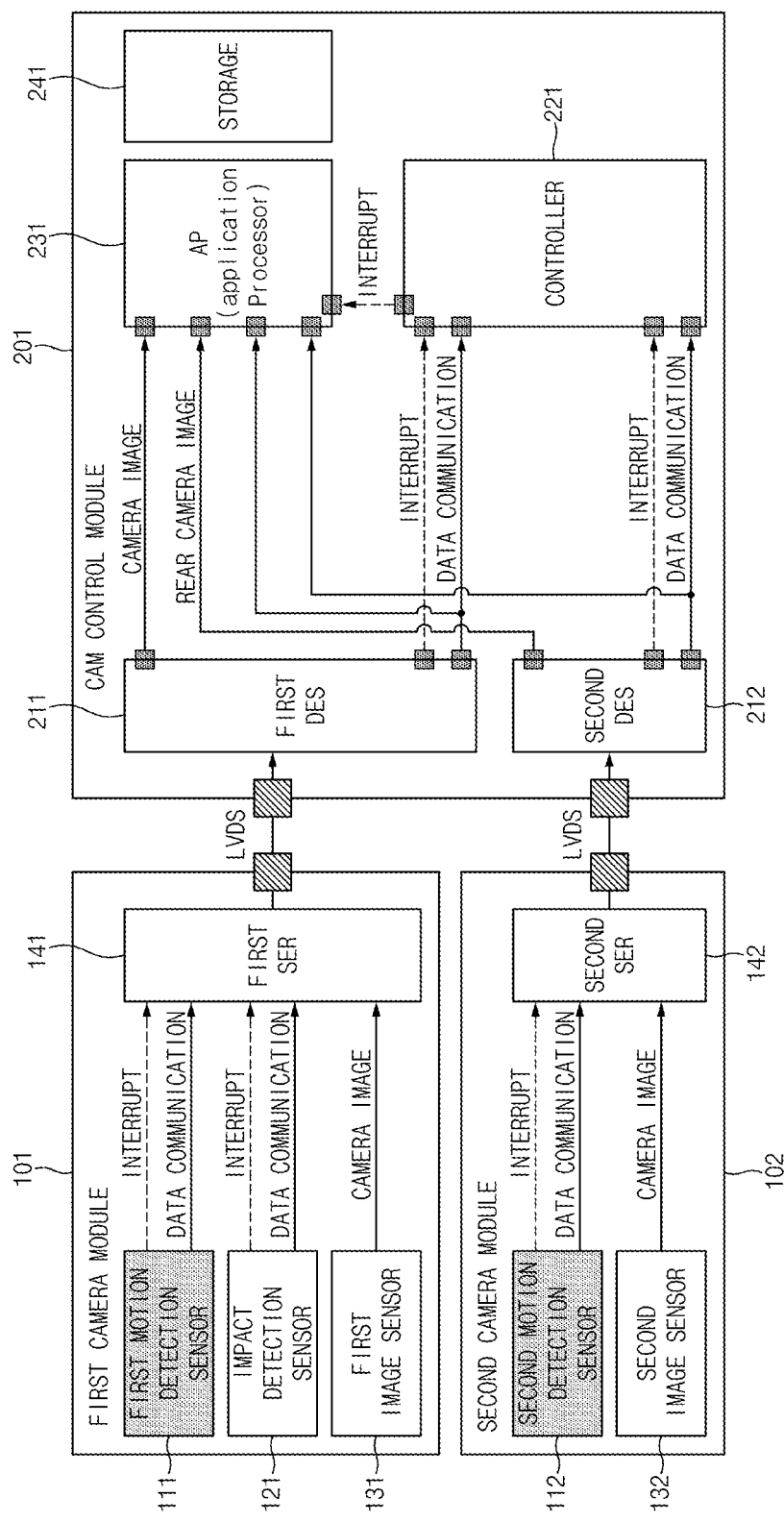
FIGS. 7, FIG. 8, FIG. 9, and FIG. 10 are diagrams for describing a procedure in which configurations of a video recording apparatus are activated.

A procedure in which the first and second motion detection sensors 111 and 112 are activated may include a procedure of deactivating a unit other than the first and second motion detection sensors 111 and 112. For example, as illustrated in FIG. 7, the first and second motion detection sensors 111 and 112 may be activated based on a fact that an engine is turned off. At the same time, the impact detection sensor 121, the first and second image sensors 131 and 132, the first SER 141, the second SER 142, the first DES 211, the second DES 212, the controller 221, and the AP 231 may be turned off and then may enter a deactivation state.

A step in which the first and second motion detection sensors 111 and 112 monitor an external object may be performed based on a reception signal of radar. The first and second motion detection sensors 111 and 112 may obtain sensing data in a digital format at regular intervals based on the reception signal of the radar and may determine the signal strength of the reception signal or a detected distance to an object based on sensing data.

In S604, the first and second motion detection sensors 111 and 112 may determine whether motion strength of the object is equal to or greater than threshold strength. The motion strength may be determined based on the signal strength or the detected distance of the object. That is, the first and second motion detection sensors 111 and 112 may monitor the signal strength of the reception signal or the detected distance of the object based on the sensing data.

In S605, the first motion detection sensor 111 or the second motion detection sensor 112 may output an activation signal based on a fact that the motion of an object having the motion strength greater than or equal to the threshold strength is detected.

According to an embodiment, the first motion detection sensor 111 or the second motion detection sensor 112 may determine that the motion strength is equal to or greater than the threshold strength, based on a fact that the signal strength is greater than or equal to the threshold strength.

According to another embodiment, the first motion detection sensor 111 or the second motion detection sensor 112 may determine that the motion strength is equal to or greater than the threshold strength, based on a fact that the distance of the object is less than a threshold distance.

Figure 8:
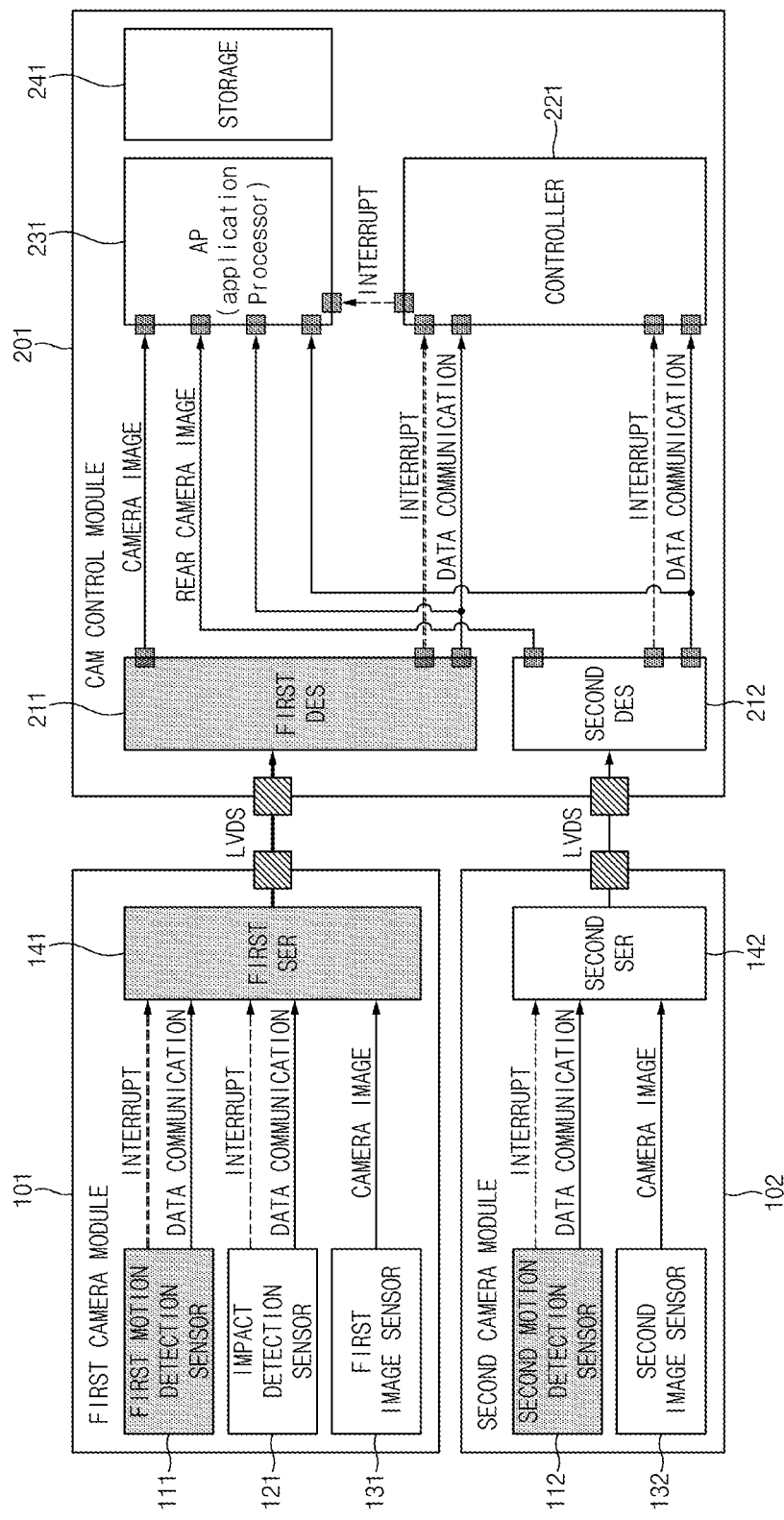

The first motion detection sensor 111 or the second motion detection sensor 112 may generate an interrupt based on a fact that the motion strength is greater than or equal to the threshold strength. On the basis of interrupt generation, the first motion detection sensor 111 may transmit the activation signal to the first SER 141 in a digital output method or the second motion detection sensor 112 may transmit the activation signal to the second SER 142 in a digital output method. For example, as illustrated in FIG. 8, when the first motion detection sensor 111 detects motion having the threshold strength or more, the first motion detection sensor 111 may transmit the activation signal to the first SER 141 in the digital output method. Hereinafter, a controlling method of a video recording apparatus will be described based on a state where the first motion detection sensor 111 is activated.

In S606, the controller 221 may be activated based on the received interrupt. The first SER 141 receiving the activation signal may deliver the activation signal to the first DES 211 based on LVDS. Moreover, as shown in FIG. 9, the first DES 211 may transmit the activation signal to the controller 221 in the digital output method.

Figure 9:
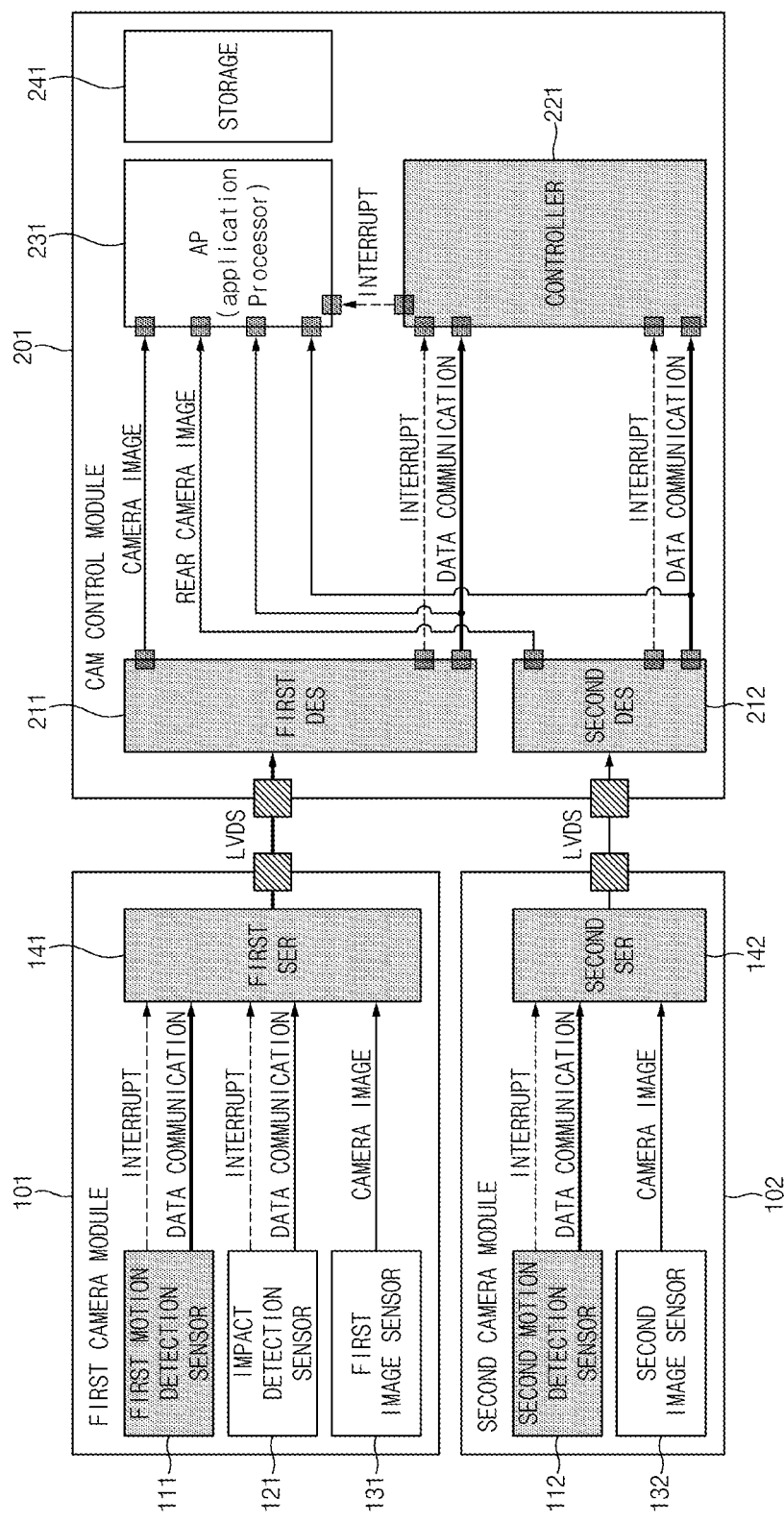

In S607, the controller 221 may receive sensing data as shown in FIG. 9 and may determine the necessity of video recording based on the sensing data. The controller 221 may determine the necessity of video recording based on the motion pattern of the object.

To this end, the controller 221 may receive the sensing data from the first motion detection sensor 111 during a predetermined time period. The controller 221 may detect target data based on the signal strength of sensing data received during the predetermined time period or the detected distance. The controller 221 may determine the motion pattern of the object based on the target data.

Figure 10:
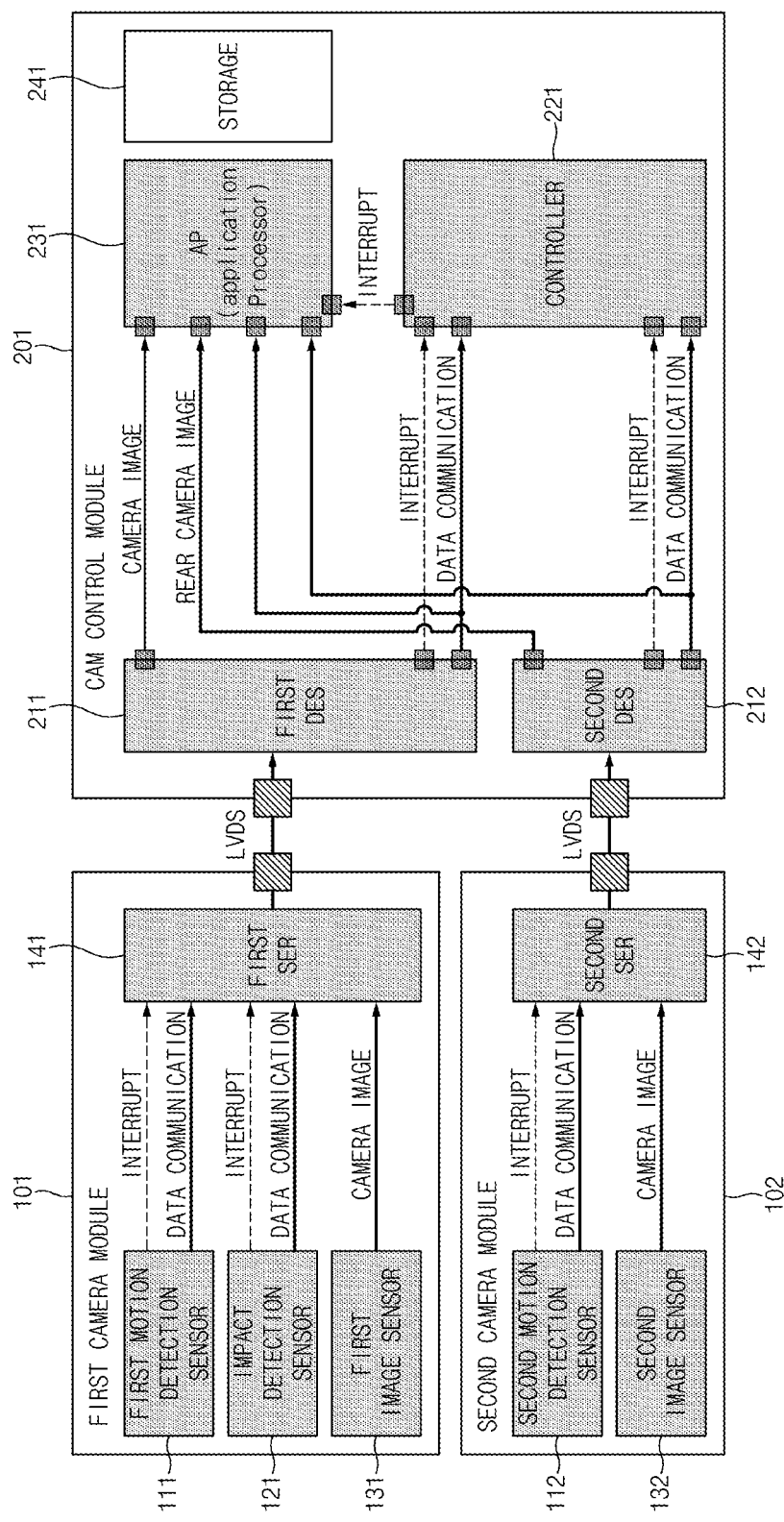

In S608, as shown in FIG. 10, the controller 221 may activate the AP 231 depending on a result of determining the motion pattern of the object based on the sensing data. The activated AP 231 may store image data obtained by an image sensor in the storage 241.

In S609, the controller 221 may deactivate the AP depending on the result of determining the motion pattern of the object based on the sensing data.

The procedure for deactivating the AP may include a procedure (S609 and S610) for deactivating the controller 221 again based on the activation time of the controller 221. That is, in S609, the controller 221 may identify the time when the activation has been maintained (S609). The controller 221 may enter a deactivation state based on a fact that the activation time is greater than or equal to the threshold time (S610).

According to the determination of S607, an embodiment of the process of entering the procedure S608 or S609 will be described with reference to FIGS. 11 to 16 as follows.

FIGS. 11 to 13 are diagrams for describing an embodiment of determining whether to activate an AP according to the signal strength of sensing data.

Referring to FIG. 11, the controller 221 may receive sensing data during a predetermined time period based on detecting an interrupt. The controller 221 may detect target data, which has signal strength greater than or equal to threshold strength, from among the sensing data. Moreover, the controller 221 may maintain the deactivation state of the AP 231 based on a fact that the number of target data is less than a first threshold value.

As the first threshold value increases, a possibility that an unnecessary image is to be recorded decreases. However, there may be a possibility that an image that needs to be recorded may not be recorded. Alternatively, as the first threshold value decreases, a possibility that an unnecessary image is to be recorded increases. However, a possibility that images requiring recording is missing may be reduced. Accordingly, the first threshold value may be set to adjust a possibility that images requiring recording are missing and a possibility that unnecessary images are to be recorded.

Referring to FIG. 12, the controller 221 may receive sensing data during a predetermined time period based on detecting an interrupt. The controller 221 may detect target data, which has signal strength greater than or equal to threshold strength, from among the sensing data.

The controller 221 may determine the signal strength tendency of the target data. As illustrated in FIG. 12, when the signal strength of the target data has a tendency to gradually decrease, the controller 221 may determine the deactivation of the AP 231. The tendency of signal strength may be determined based on a signal strength deviation between pieces of target data thus adjacent to each other. For example, the controller 221 may calculate a signal strength deviation between (n+1)-th target data ('n' is a natural number) and n-th target data among the pieces of target data during a predetermined time period, and may determine that the signal strength of the target data has a tendency to decrease, based on a fact that the number of zeros or negative values among signal strength deviations is not less than a fifth threshold value.

As the fifth threshold value increases, a possibility that an unnecessary image is to be recorded decreases. However, there may be a possibility that an image that needs to be recorded may not be recorded. Alternatively, as the fifth threshold value decreases, a possibility that an unnecessary image is to be recorded increases. However, a possibility that images requiring recording is missing may be reduced. Accordingly, the fifth threshold value may be set to adjust a possibility that images requiring recording are missing and a possibility that unnecessary images are to be recorded.

Referring to FIG. 13, the controller 221 may receive sensing data during a predetermined time period based on detecting an interrupt. The controller 221 may detect target data, which has signal strength greater than or equal to threshold strength, from among the sensing data.

The controller 221 may determine the signal strength tendency of the target data. As illustrated in FIG. 13, when the magnitude of the signal strength of the target data is maintained or has a tendency to increase, the controller 221 may determine the activation of the AP 231. The tendency of signal strength may be determined based on a signal strength deviation between pieces of target data thus adjacent to each other. The controller 221 may calculate a signal strength deviation between (n+1)-th target data ('n' is a natural number) and n-th target data among the pieces of target data during a predetermined time period, and may determine that the signal strength of the target data has a tendency to increase, based on a fact that the number of positive values among signal strength deviations is not less than the third threshold value. That is, the controller 221 may activate the image processor 230 based on a fact that the number of positive values among the signal strength deviations is not less than the third threshold value.

FIGS. 14 to 16 are diagrams for describing an embodiment of determining whether to activate an AP according to a detected distance of sensing data.

Referring to FIG. 14, the controller 221 may receive sensing data during a predetermined time period based on detecting an interrupt. The controller 221 may detect target data having a detected distance less than a threshold distance among the sensing data. Moreover, the controller 221 may determine the deactivation of the AP 231 based on a fact that the number of target data is less than the second threshold value.

As the second threshold value increases, a possibility that an unnecessary image is to be recorded decreases. However, there may be a possibility that an image that needs to be recorded may not be recorded. Alternatively, as the second threshold value decreases, a possibility that an unnecessary image is to be recorded increases. However, a possibility that images requiring recording is missing may be reduced. Accordingly, the second threshold value may be set to adjust a possibility that images requiring recording are missing and a possibility that unnecessary images are to be recorded.

Referring to FIG. 15, the controller 221 may receive sensing data during a predetermined time period based on detecting an interrupt. The controller 221 may detect target data having a detected distance less than a threshold distance among the sensing data.

The controller 221 may determine the detected distance tendency of the target data. As illustrated in FIG. 15, when the detected distance of the target data has a tendency to gradually move away, the controller 221 may determine the deactivation of the AP 231. The tendency of the detected distance may be determined based on a detected distance deviation between pieces of target data thus adjacent to each other. For example, the controller 221 may calculate a detected distance deviation between (n+1)-th target data ('n' is a natural number) and n-th target data among the pieces of target data during a predetermined time period, and may determine that the detected distance of the target data has a tendency to gradually move away, based on a fact that the number of positive values among detected distance deviations is not less than a sixth threshold value.

As the sixth threshold value increases, a possibility that an unnecessary image is to be recorded decreases. However, there may be a possibility that an image that needs to be recorded may not be recorded. Alternatively, as the sixth threshold value decreases, a possibility that an unnecessary image is to be recorded increases. However, a possibility that images requiring recording is missing may be reduced. Accordingly, the sixth threshold value may be set to adjust a possibility that images requiring recording are missing and a possibility that unnecessary images are to be recorded.

Referring to FIG. 16, the controller 221 may receive sensing data during a predetermined time period based on detecting an interrupt. The controller 221 may detect target data having a detected distance less than a threshold distance among the sensing data.

The controller 221 may determine the tendency of the detected distance. As illustrated in FIG. 16, when the detected distance of the target data has a tendency to be maintained or approached, the controller 221 may determine the activation of the AP 231. The tendency of the detected distance may be determined based on a detected distance deviation between pieces of target data thus adjacent to each other. For example, the controller 221 may calculate a detected distance deviation between (n+1)-th target data ('n' is a natural number) and n-th target data among the pieces of target data during a predetermined time period, and may determine that the detected distance of the target data has a tendency to be approached, based on a fact that the number of zeros or negative values among detected distance deviations is not less than the fourth threshold value. That is, the controller 221 may activate the AP 231 based on a fact that the number of zeros or negative values among detected distance deviations is not less than the fourth threshold value.

Figure 17:
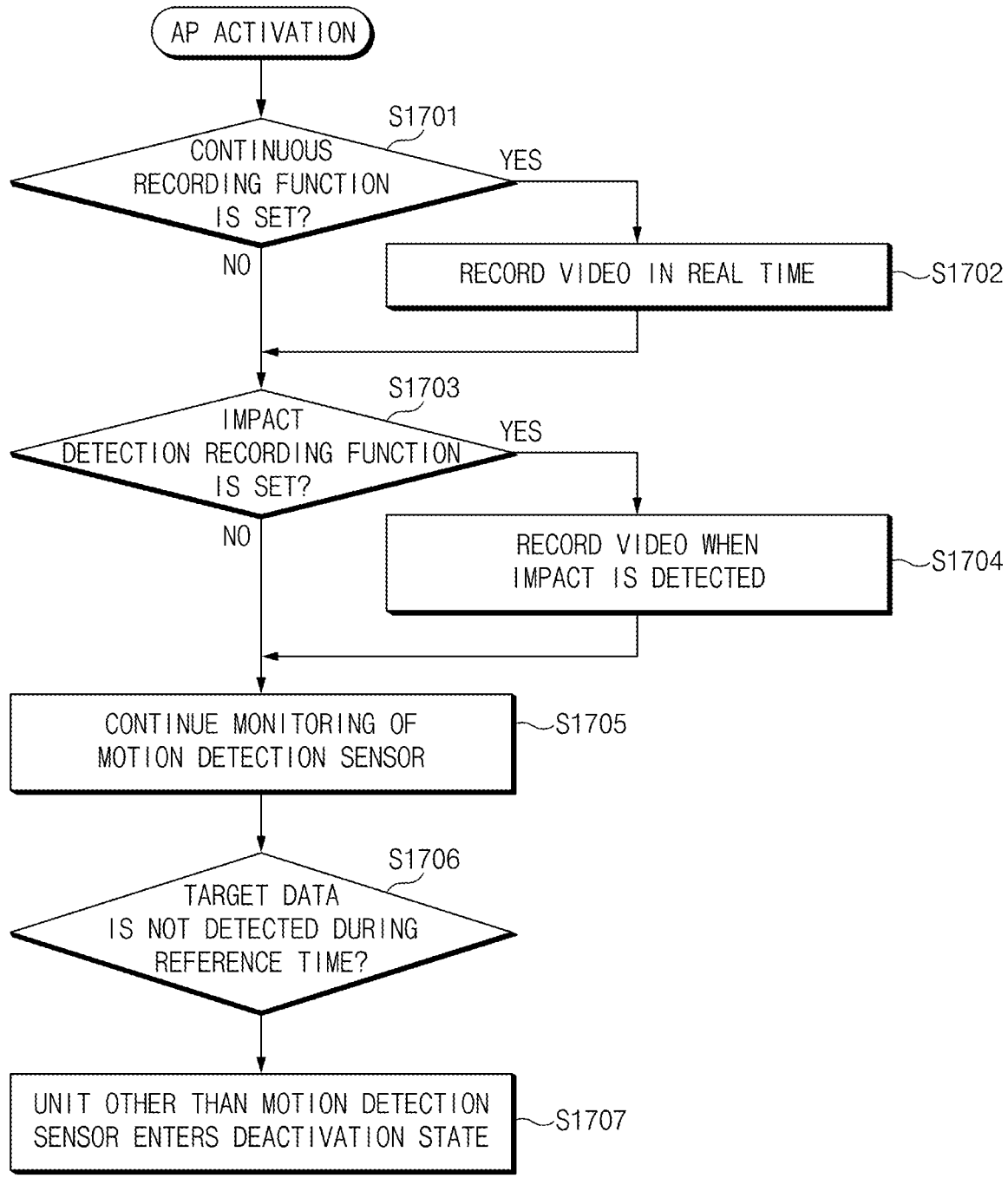
FIG. 17 is a flowchart illustrating a controlling method of a video recording apparatus, according to another embodiment of the present disclosure.

FIG. 17 is a flowchart illustrating a controlling method of a video recording apparatus, according to another embodiment of the present disclosure. In particular, FIG. 17 is a flowchart illustrating a procedure after AP activation.

A controlling method of a video recording apparatus after the AP activation is described with reference to FIG. 17 as follows.

In S1701, it may be determined whether a continuous recording function is set, based on the AP activation.

When the continuous recording function is set, in S1702, the AP may control real-time video recording. That is, image data obtained by an image sensor may be stored in time series.

In S1703, the AP 231 may determine whether an impact detection recording function is set.

In S1704, the AP 231 may monitor the impact detection sensor 121 based on a fact that the impact detection recording function is set. Besides, when the impact detection sensor 121 detects that an impact is applied to a vehicle, the AP 231 may perform video recording.

In S1705, when the continuous recording function or the impact detection function is not set, the first and second motion detection sensors 111 and 112 may continue to monitor the motion of an object.

In S1706, and S1707, when target data among pieces of sensing data is not detected during a reference time, units other than the first and second motion detection sensors 111 and 112 may enter a deactivation state. That is, as illustrated in S602 of FIG. 6, the impact detection sensor 121, the first and second image sensors 131 and 132, the first SER 141, the second SER 142, the first DES 211, the second DES 212, the controller 221, and the AP 231 may be switched to a deactivation state.

Hereinafter, an operation and effect of a video recording apparatus according to an embodiment of the present disclosure will be described as follows. The following description will be described based on FIG. 1 to which one camera module is applied.

According to an embodiment of the present disclosure, images may be prevented from being recorded due to non-threatening natural phenomena. Snow, rain, fallen leaves, and the like may not be detected as objects depending on the setting of the interrupt output sensitivity. However, due to a sensing error or a specific matter, an interrupt may be generated by the motion detection sensor 110 due to an object such as snow, rain, or fallen leaves. Because signal strength caused by snow, rain, fallen leaves, or the like is not generally determined as target data, the target data caused by such natural phenomena may be sporadic. According to an embodiment of the present disclosure, the AP 130 may not be activated by sporadic target data as shown in FIG. 11. Accordingly, images may be prevented from being recorded due to non-threatening natural phenomena.

According to an embodiment of the present disclosure, images may be prevented from being recorded due to a pedestrian at a distance or moving away.

An interrupt is detected due to a pedestrian or vehicle, and the controller 220 may be activated. When objects maintain a distance as illustrated in FIG. 14 or when objects move away as illustrated in FIG. 15, the controller 220 may not activate the AP 231 for video recording. Accordingly, power consumption and memory space waste due to unnecessary video recording may be improved.

Video recording due to a collision with a vehicle may proceed as shown in FIG. 16.

When the detected distance of an object is long, the motion detection sensor 110 does not generate an interrupt. When an interrupt is generated because the detected distance is short, the controller 220 may be activated and may monitor an object during a predetermined time period. Because the object gradually approaches the vehicle, the controller 220 may activate the AP 231 and may proceed with video recording.

Depending on a predetermined video recording function, the AP 231 may record continuous images from a point in time when the AP 231 is activated. Alternatively, the AP 231 may record images based on a fact that the impact detection sensor 120 detects a collision.

While video is being recording by the AP 231, the motion detection sensor 110 may continue to monitor an object. When the monitoring result indicates that motion strength is less than a specific level, other units other than the motion detection sensor 110 may enter a deactivation state.

Figure 18:
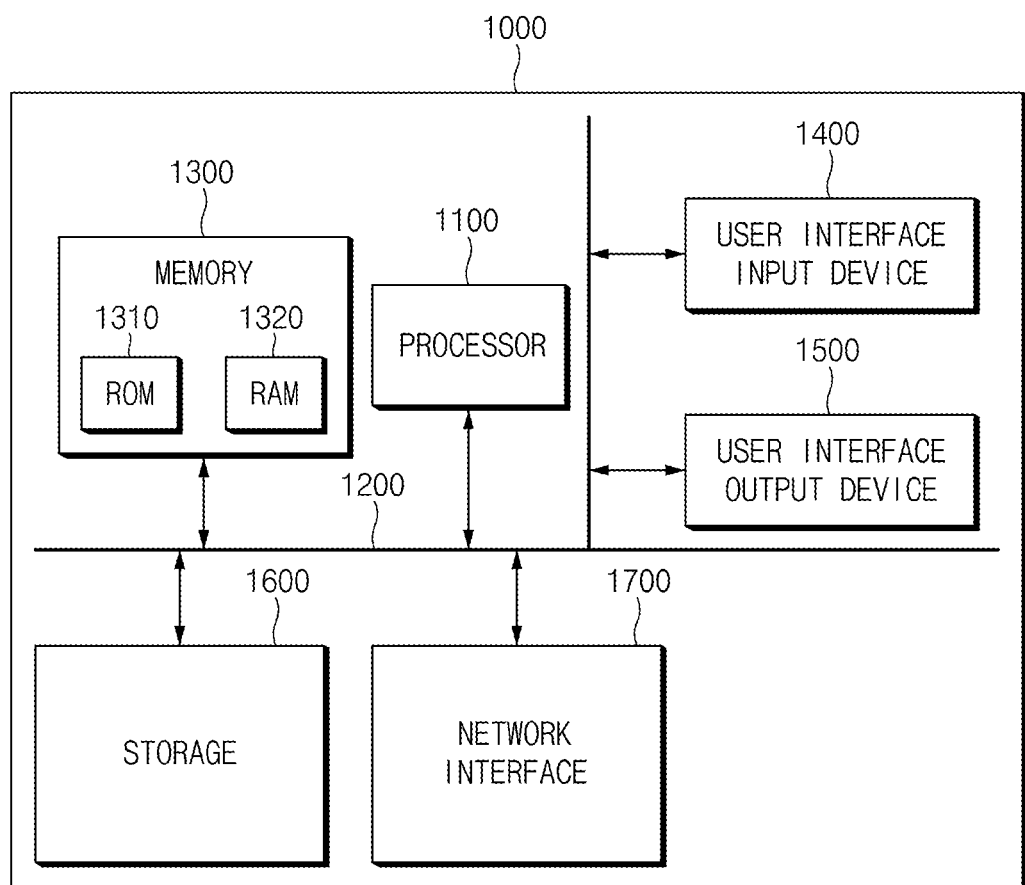
FIG. 18 is a block diagram illustrating a computing system according to an embodiment of the present disclosure.

FIG. 18 illustrates a computing system according to an embodiment of the present disclosure.

Referring to FIG. 18, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. In particular, the processor 1100 according to an embodiment of the present disclosure may include the cam control module 200. Each of the memory 1300 and the storage 1600 may include various types of volatile or nonvolatile storage media. For example, the memory 1300 may include a read only memory (ROM) and a random access memory (RAM).

Thus, the operations of the methods or algorithms described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM).

The storage medium may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

The above description is merely an example of the technical idea of the present disclosure, and various modifications and modifications may be made by one skilled in the art without departing from the essential characteristic of the present disclosure.

Accordingly, embodiments of the present disclosure are intended not to limit but to explain the technical idea of the present disclosure, and the scope and spirit of the present disclosure is not limited by the above embodiments. The scope of protection of the present disclosure should be construed by the attached claims, and all equivalents thereof should be construed as being included within the scope of the present disclosure.

According to a controlling method of a video recording apparatus according to an embodiment of the present disclosure, because a controller is activated based on motion detection, unnecessary power consumption for an operation of the controller may be reduced while a vehicle is turned off.

Moreover, according to the controlling method of the video recording apparatus according to an embodiment of the present disclosure, because an image processor is activated depending on the type and motion of an object identified based on the monitoring result of the object, power consumed to record unnecessary images may be improved.

Besides, according to the controlling method of the video recording apparatus according to an embodiment of the present disclosure, because video recording is not performed for an object, which is not a threat to a vehicle, based on the monitoring of the object, unnecessary images may be prevented from being recorded.

Besides, a variety of effects directly or indirectly understood through the specification may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A video recording apparatus, comprising:
a motion detection sensor configured to:
obtain sensing data in a digital format at specific intervals based on a reception signal of radar; and
determine signal strength of the reception signal based on the obtained sensing data;
a controller configured to:
activate when the motion detection sensor senses motion of an external object;
receive the sensing data from the motion detection sensor during a predetermined time period;
determine target data based on a determination that the signal strength is greater than or equal to a threshold strength;
calculate signal strength deviations between (n+1)-th target data, where n is a natural number, and n-th target data among pieces of target data during the predetermined time period; and
activate an image processor when a number of corresponding positive values among the signal strength deviations is greater than or equal to a first reference value; and
the image processor configured to activate based on a monitoring result of the external object and perform a video recording function of an outside of a vehicle.

2. The video recording apparatus of claim 1, wherein the controller and the image processor are each configured to enter a deactivation state when an ignition is turned off.

3. The video recording apparatus of claim 1, wherein the motion detection sensor is further configured to:
generate an activation signal for allowing the motion detection sensor to activate the controller, and
transmit the activation signal to the controller based on low voltage differential signaling (LVDS).

4. The video recording apparatus of claim 1, wherein the controller is further configured to:
maintain a deactivation state of the image processor based on the target data.

5. The video recording apparatus of claim 4, wherein the controller is further configured to maintain the deactivation state of the image processor when a first number corresponding to the target data having the signal strength greater than or equal to threshold strength is less than a first threshold value and/or a second number corresponding to the target data having a detected distance less than a threshold distance is less than a second threshold value.

6. A video recording apparatus, comprising:
a motion detection sensor configured to:
obtain sensing data in a digital format at specific intervals based on a reception signal of radar; and
determine a detected distance of an external object based on the obtained sensing data;
a controller configured to:
activate when the motion detection sensor senses motion of the external object;
receive the sensing data from the motion detection sensor during a predetermined time period;
determine target data based on a determination that the detected distance is less than a threshold distance; and
activate an image processor based on a monitoring result of the external object and perform a video recording function of an outside of a vehicle;
wherein the controller is further configured to:
calculate detected distance deviations between (n+1)-th target data, where n is a natural number, and n-th target data among pieces of target data during the predetermined time period, and activate the image processor when a number of zeros or negative values among the detected distance deviations is greater than or equal to a fourth threshold value.

7. The video recording apparatus of claim 1, wherein the controller is further configured to enter a deactivation state when the image processor maintains a deactivation state.

8. The video recording apparatus of claim 1, further comprising:
an image sensor configured to activate under control of the image processor and obtain an image; and
a memory storage configured to store the image obtained by the image sensor.

9. A controlling method of a video recording apparatus, the method comprising:
obtaining, by a motion detection sensor of a camera module, sensing data in a digital format at specific intervals based on a reception signal of radar;
determining, by the motion detection sensor, signal strength of the reception signal based on the obtained sensing data;
activating, by the motion detection sensor, a controller of a cam control module when an external object is detected by the motion detection sensor;
receiving, by the controller, the sensing data from the motion detection sensor during a predetermined time period based on activation of the controller;
determining, by the controller, target data based on a determination that the signal strength is greater than or equal to a threshold strength;
calculating, by the controller, signal strength deviations between (n+1)-th target data, where n is a natural number, and n-th target data among pieces of target data during the predetermined time period; and
activating, by the controller, an image processor when a number of corresponding positive values among the signal strength deviations is greater than or equal to a first reference value.

10. The method of claim 9, wherein the controller and the image processor enter a deactivation state in case of an ignition off.

11. The method of claim 9, wherein activating the controller further includes: generating an activation signal for allowing the motion detection sensor to activate the controller when the signal strength is greater than or equal to a threshold strength and/or a detected distance is less than a threshold distance; and transmitting the activation signal to the controller based on low voltage differential signaling (LVDS).

12. The method of claim 11, wherein activating the image processor further includes:
maintaining a deactivation state of the image processor based on the target data.

13. The method of claim 12, wherein maintaining the deactivation state of the image processor is performed when a first number corresponding to the target data having the signal strength greater than or equal to the threshold strength is less than a first threshold value and/or a second number corresponding to the target data having the detected distance less than the threshold distance is less than a second threshold value.

14. A controlling method of a video recording apparatus, the method comprising:
obtaining, by a motion detection sensor of a camera module, sensing data in a digital format at specific intervals based on a reception signal of radar;
determining, by the motion detection sensor, a detected distance of an external object based on the obtained sensing data;
activating, by the motion detection sensor, a controller of a cam control module when the external object is detected by the motion detection sensor;
receiving, by the controller, the sensing data from the motion detection sensor during a predetermined time period based on activation of the controller;
determining, by the controller, target data based on a determination that the detected distance is less than a threshold distance;
calculating detected distance deviations between (n+1)-th target data, where n is a natural number, and n-th target data among pieces of target data during the predetermined time period; and
activating the image processor when a number of zeros or negative values among the detected distance deviations is greater than or equal to a fourth threshold value.

15. The method of claim 9, wherein activating the image processor further includes:
maintaining a deactivation state of the image processor based on sensing motion of the external object by the motion detection sensor, and
wherein the controller switches from an activated state to a deactivation state when the deactivation of the image processor is maintained.

16. The method of claim 9, further comprising:
storing, by the image processor, an image signal obtained by an image sensor of the camera module in memory storage when the image processor is activated.

* * * * *